United States Patent [19]

McDonald

[11] 4,051,020

[45] Sept. 27, 1977

[54] HYDROCARBON CONVERSION PROCESS FOR REMOVING SULFUR AND NITROGEN WITH PASSAGE OF CATALYST PARTICLES IN A SERIES OF SPACED BEDS

[75] Inventor: Gerald W. G. McDonald, Summit, N.J.

[73] Assignee: Commonwealth Oil Refining Co. Inc.

[21] Appl. No.: 695,398

[22] Filed: June 14, 1976

Related U.S. Application Data

[62] Division of Ser. No. 627,127, Oct. 30, 1975.

[51] Int. Cl.$^2$ ............................................. C10G 23/00
[52] U.S. Cl. ................... 208/213; 208/156; 208/157; 208/164; 208/254 H
[58] Field of Search ............... 208/213, 216, 209, 211, 208/108, 150, 151, 152, 153, 157, 156, 254 H, 164

[56] References Cited

U.S. PATENT DOCUMENTS

| | | | |
|---|---|---|---|
| 2,444,990 | 7/1948 | Hemminger | 208/156 |
| 2,587,149 | 2/1952 | Gwynn | 208/213 |
| 2,664,967 | 1/1954 | Molstedt | 208/156 |
| 2,676,668 | 4/1954 | Lindsay | 208/156 |
| 2,744,053 | 5/1956 | Kay et al. | 208/211 |
| 2,793,170 | 5/1957 | Stiles et al. | 208/216 |
| 2,853,438 | 9/1958 | Berg | 208/216 |
| 2,891,906 | 6/1959 | Wood | 208/216 |

Primary Examiner—George Crasanakis

[57] ABSTRACT

A gas phase and a liquid phase pass countercurrently through a reaction vessel, and solid particles move from stage to stage in the reactor concurrently with either the liquid phase or the gas phase. In one embodiment of the invention the liquid phase is a hydrocarbon oil to be treated, for example, desulphurized, the gas phase is hydrogen, and the solid particles are hydrodesulphurization catalyst particles.

7 Claims, 2 Drawing Figures

HYDROCARBON CONVERSION PROCESS FOR REMOVING SULFUR AND NITROGEN WITH PASSAGE OF CATALYST PARTICLES IN A SERIES OF SPACED BEDS

This is a division of application Ser. No. 627,127, filed Oct. 30, 1975.

BACKGROUND OF THE INVENTION

This invention relates to multi-stage reactors in which a liquid phase and a gas phase flow countercurrently, and in which solid phase particles move from one stage of the reactor to the next. The invention also relates to reactions involving liquid, gas and solid phases in which the solid may be a catalyst for the reaction, inert, or a reactant.

In many reactions, it is necessary to achieve intimate contact between a gaseous phase, a liquid phase and a solid. The gas or mixture of gases may be a reactant, may be required to maintain catalyst activity, may be necessary to maintain an atmosphere or environment suitable for the required operation, or may be required for agitation. The liquid or mixture of liquids may be a reactant, a solvent or a carrying agent. The solid or mixture of solids may be a catalyst, an absorbent, a reactant or a heat transfer agent.

Typically in the prior art the gas and liquid phase flow concurrently through a fixed bed or beds of the solid phase. Although less common, countercurrent flow of reactants is also well known, and there are some reactions involving moving solid phases, for example, moving beds of catalyst particles.

SUMMARY OF THE INVENTION

The present invention relates to a novel multi-stage reactor and process involving passing a gas phase and a liquid phase countercurrently to each other, and transporting particles comprising a solid phase from one zone of the reactor to another zone concurrently with either the liquid phase or the gas phase.

In an embodiment of the invention in which the solid phase particles move through the reactor concurrently with the gas phase, the principal point of introduction of the gas phase may be adjacent the bottom of the reactor. A perforated plate supports the solid particles in a first zone, and an eductor mechanism is designed to elevate solid particles, as well as some of the liquid in the reactor, to the next adjacent stage where the solid particles are supported upon another perforated plate. The liquid phase is introduced adjacent the top of the reactor and flows downwardly from one stage to another through downcomers to an exit at the bottom of the reactor. Preferably the gas flow rate and the size of the perforations are such that the gas moving upwardly through the reactor through the perforated screens prevents any major leakage of the liquid phase through the perforations. Solid particles withdrawn from the top stage may be discarded or recycled to the reactor.

Instead of the solids moving upwardly from zone to zone, the solids may be introduced at the top of the reactor and flow downwardly through a valved downcomer or the like. In such an embodiment. the solids move downwardly concurrently with a liquid phase introduced adjacent the top of the reactor and which exits at the bottom of the reactor.

If desired the invention may operate with two separate solid phases, one in an upper region of the reactor and the other in the lower region of the reactor. Within each region the respective solid phase may move from at least one stage or zone to another adjacent stage. Two separate solids phases might be employed to advantage in reactions where the reactants tends to foul catalyst particles, and it would be desirable to use a cheaper catalyst near the liquid feed inlet and to introduce into subsequent stages of the reactor a different, more effective and expensive catalyst after many of the contaminants have been removed by the first catalyst. Three or more solid phases could be employed through the further extension of similar techniques.

The invention although susceptible of many uses will be described hereinafter primarily in connection with hydrocarbon conversion processes involving the reaction of a hydrocarbon oil in the presence of a gaseous hydrogen phase and solid catalyst particles. Such hydrocarbon conversion reactions involve the reaction of a hydrocarbon feed with hydrogen to form more valuable hydrocarbon products, and these reactions include hydrodesulphurization, hydrofining, and hydrocracking.

Among other reactions capable of being carried out in the reactor of the invention are the hydrogenation of pulverized coal in a hydrocarbon or other carrier, the separation of one liquid from another employing an adsorbant, for example, the recovery of normal paraffins from a liquid stream such as kerosene employing a stero-selective molecular sieve, particularly a crystalline aluminosilicate having pores of substantially uniform size capable of accepting the normal paraffins or other product to be absorbed.

The above and other objects, features and advantages of the invention will become more apparent as this description proceeds.

DETAILED DESCRIPTION OF THE INVENTION

Figure 1:
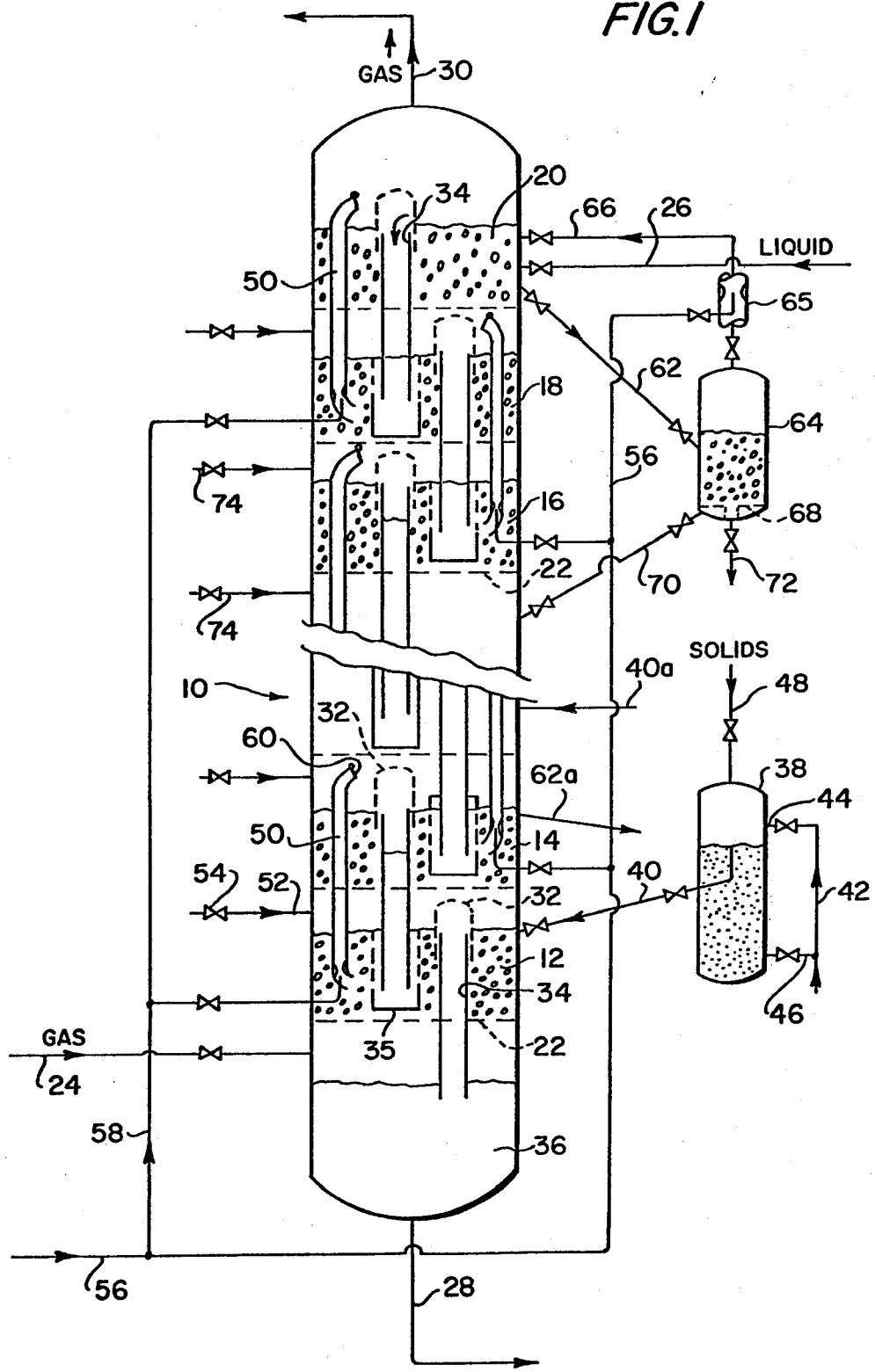
FIG. 1 is a somewhat diagrammatic elevational view of a reactor in accordance with a presently preferred embodiment of the invention wherein the solid phase passes upwardly through a multi-stage reactor concurrently with the gas phase and countercurrent to the liquid phase.

Referring now to the drawings and more particularly to FIG. 1, reference numeral 10 generally designates a multi-stage reactor in accordance with a presently preferred embodiment of the invention. Within the reactor a series of superimposed catalyst beds 12, 14, 16, 18, and 20 comprise the solid phase. The catalyst beds are supported upon perforated support plates 22.

A gaseous phase comprised of hydrogen rich gas enters the reactor below the lowermost perforated plate 22 through gas inlet line 24. A hydrocarbon oil liquid phase enters at the top of the reactor into the uppermost catalyst bed 20 through inlet line 26. The hydrocarbon oil flows downwardly countercurrent to the gas phase as will be described hereinafter while undergoing reaction, and eventually the liquid reaction products are removed from the bottom of the reactor through line 28. Unreacted hydrogen and gases is formed in the reactor are vented through line 30 at the top of the reactor 10.

The hydrogen entering the reactor through inlet line 24 bubbles up through the lowermost plate 22 into the catalyst and liquid in that stage. The area of the perforations in plate 22 is such that the distribution of the gas passing upwardly to the reactor is controlled and there is minimal leakage of liquid downwardly through the perforations. In each stage the liquid level builds up until it overflows through a perforated screen 32 into the top of the downcomer 34. The downcomer of the lowermost stage discharges into a body of liquid product 36 at the bottom of the reactor. The rate of withdrawal of the liquid product through line 28 is regulated to maintain the level of liquid 36 slightly above the bottom of the lowest stage downcomer 34. Each of the other downcomers discharges liquid from one stage to the next lower stage through a screened enclosure 35 in the catalyst bed.

The catalyst particles or other solid phase particles are introduced to the system from a solids supply tank 38 through line 40 to the lowermost bed 12 using a flushing medium which may either be a liquid or a gas and preferably is a suitably treated portion of the liquid product from line 28. The flushing medium enters supply vessel 38 through line 42 which has upper and lower valved connecting lines 44 and 46 leading to the supply tank. The rates of addition of the flushing medium is adjusted by progressively decreasing the flow through upper line 44 while increasing flow through lower line 46 to obtain an orderly transfer of solids through line 40 to the reactor without plugging the transfer line. Periodically fresh catalyst may be added to supply tank 38 through solids inlet line 48.

Suitable hydrocarbon conversion catalysts are well known in the art and include, inter alia, synthetic crystalline aluminosilicates which in view of their high activity are usually deposited upon relatively inert supports such as silica-alumina particles. The catalyst density and particle size are selected so that the range of gas velocities in the reactor will result in the catalyst particles remaining in suspension in the liquid in the various beds. The perforations in the supporting plates 22 and in the screen 32 and 35 are smaller than the minimum catalyst particle size to preclude the catalyst particles passing through the support plates or into the liquid downcomers 34.

The catalyst particles are transferred from one bed to the super-adjacent bed via eductor tubes 50 which have their lower ends disposed in the catalyst of the lower bed and have their upper ends positioned to discharge catalyst above the level of catalyst in the superadjacent bed. Catalyst particles and liquid from the lower bed are educted upwardly via a gaseous or liquid transfer medium entering through line 52 upon opening of valve 54. The transfer medium may be, for example, hydrogen gas or a liquid such as a hydrocarbon stream taken off from the reactor and recycled through lines 56, 58. A check valve 60 at the upper end of eductor 50 impedes reverse flow of gas, liquid or solids from the upper stage to the lower stage. The transfer of solids from one stage to the next may be either intermittent or continuous by appropriate regulation of the flow of the transfer medium.

Catalyst particles and a portion of the liquid in the top bed 20 are periodically drawn off through a discharge line 62 to a vessel 64. An eductor 65 supplied with a transfer medium from line 56 returns liquid separated from the solids in vessel 64 to the upper bed through line 66. In vessel 64 the withdrawn catalyst particles are supported upon perforated screen 68. Separated liquid beneath screen 68 in the bottom of vessel 64 may be passed through line 70 to an intermediate point in the reactor. The purged catalyst particles are removed from vessel 64 through discharge line 72. In some applications, the catalyst may now be recycled to the solid supply vessel 38, after regeneration, if necessary.

In various hydrocarbon conversion reactions such as the hydrodesulfurization of residual fuel oils the solid impurities, principally salts and other metallic compounds in the oil are deposited on the catalyst and thereby deactivate the catalyst. It is, therefore, advantageous to process the oil counter-current to the catalyst so that the incoming oil is exposed to spent catalyst laden with absorbed impurities while oil immediately before its exit from the reactor 10 encounters fresh, active catalyst so that maximum desulfurization, denitrification and other reactions is combined with optimum catalyst utilization.

Likewise, in this application the hydrogen rich gas passes from the bottom of the reactor where its high hydrogen content and low impurity content preserves the activity of the fresh catalyst and promotes the completion of desulfurization and other reactions. The desulfurization of fuel oils produces products such as hydrogen sulfide, ammonia and light hydrocarbons which dilute the hydrogen rich gas, reduce the partial pressure of hydrogen and, therefore, adversely affect the maintenance of catalyst activity and the completion of desirable reactions. Since the gas is flowing countercurrent to the liquid, these by-products can be preferentially transferred upwards through the reactor away from the lower zone where the reactions are completed in the presence of fresh catalyst and of hydrogen of higher purity. If desired, additional volumes of gas can be injected through connections 74 to promote removal of gaseous impurities, to remove the exothermic heat of reaction or for other reasons. Liquid may be also injected through connections 74 to control internal reactor temperatures.

In the manner heretofore described, the fuel oil entering through line 26 is processed countercurrent to a stream of hydrogen-rich gas and countercurrent to the movement of the catalyst in such a manner that both the gaseous and the solid impurities which inhibit desired reactions are removed from the lowest reaction zone which includes bed 12 at which point the purity of the final liquid product is largely determined.

In some instances it may be desirable to utilize two distinct catalyst phases in different regions of the reactor or to add a fresh catalyst or other solid phase at an intermediate point in the reactor. In such cases, the catalyst or other solid phase utilized in the lower region of the reactor may be drawn off through discharge line 62a to a vessel (not shown) comparable to the vessel 64 described above. A second solid phase may then be added to the reactor through a line 40a to the stage immediately above the line 62a. The second solid phase is supplied from a supply vessel (not shown) corresponding to supply vessel 18. It is not essential that the first solid phase be removed since a mixture of the two could continue upwards and be drawn off together.

Where the concentration of impurities in the residual fuel oil or similar liquid reactant is quite high, the addition of two separate catalysts or spaced addition of catalyst as mentioned above is advantageous. The catalyst or other solid phase employed in the top region of the reactor functions to remove the bulk of the impurities. Thus in some applications, it will be advantageous to employ a cheaper catalyst or absorber in the upper regions where the liquid first enters, and to employ a more expensive catalyst, in the lower region after there has been a partial purification of the liquid within the reactor.

The catalyst or other solids removed from the reactor can be regenerated, for example, by combustion, stripping or similar processes and returned to the reactor, the spent solid phase can be passed to waste. Since the solids in some residual fuel oils and other reactants are elements such as nickel, vanadium, etc. the spent solids may be processed for recovery of these elements.

The apparatus of the FIG. 1 embodiment of course may be used for many other purposes than the above described process for treating residual oil. For example, the apparatus may be utilized to separate normal paraffins from kerosene or the like employing a crystalline aluminosilicate of the appropriate pore size as an adsorbent. In such an application, the adsorbent moves upwardly from bed to bed within the reactor countercurrent to the downward flow of the liquid stream from liquid inlet 26. A gas is added through inlet line 24 for the purpose of agitating the zones within the vessel with a portion of the gas being employed in the eductors 50 to convey continuously or intermittantly the absorbent from one zone to the next higher zone. The crystalline aluminosilicate selectively adsorbs the normal paraffins from the descending liquid phase. Accordingly the absorbent particles off from the top bed 20 through line 62 are richer in normal paraffins, the paraffins are recovered by pressure reduction or by stripping, and the regenerated adsorbent particles are returned through line 48 to the supply tank 38.

Other possible applications of such procedure involve the use of an alkaline solid absorbent to recover or remove an acidic material from the liquid phase or an acid solid absorbent to recover or remove an alkaline material from the liquid phase.

Figure 2:
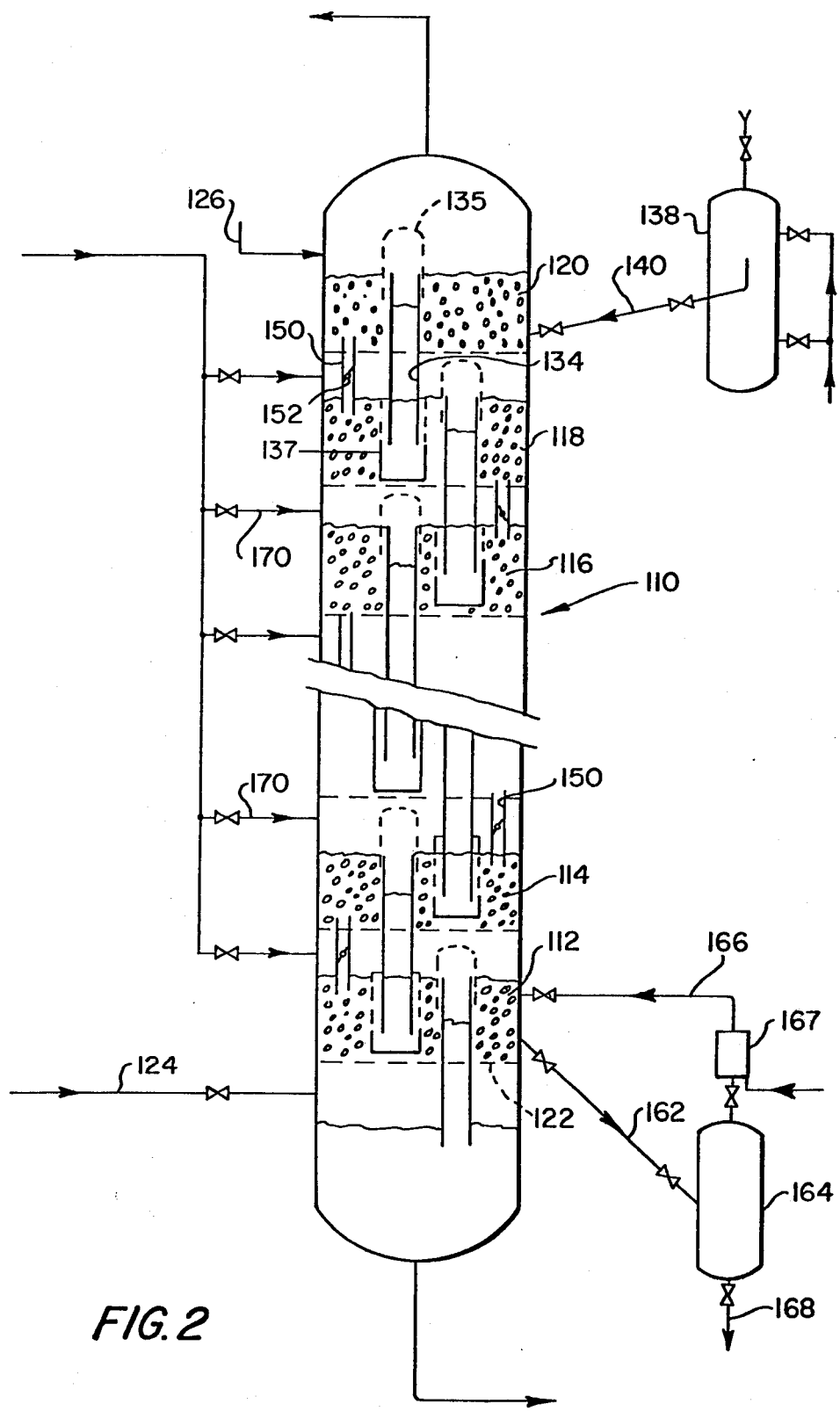
FIG. 2 is a similar elevation view of another embodiment of the invention wherein the solid phase passes downwardly through a multi-stage reactor.

FIG. 2 illustrates another embodiment of the invention in which the solid phase and the liquid phase both move downwardly within the reactor countercurrent to an upwardly moving gas phase. The solids, which may be a solid reactant, catalyst, absorber, etc. are introduced into the reactor 110 from a solids supply tank 138 through line 140. The solids flow into the upper bed 120 of a series of superimposed beds 112, 114, 116, 118 and 120. Each of the beds is supported upon a perforated plate 122. The liquid phase enters the top of the reactor through line 126, and the gas phase enters the reactor beneath bed 112 through line 124. When the level of liquid in the uppermost bed 120 reaches the top of downcomer 134, it flows through the protective perforated cover 135 into the downcomer down to the next bed 118. The liquid then flows out through a perforated screen 137 which completely surrounds the bottom of the downcomer.

If desired, the liquid or another liquid or gas may be introduced at intermediate points along the length of the reactor via lines 170.

The solid particles flow serially from one bed to the next lower bed through solids transfer tubes 150, each of which have a valve 152 to regulate the amount of catalyst or other solid flowing from one zone to the next. It will of course be appreciated that some of the liquid phase will also flow through these tubes. From the lowermost bed 122 the spent solid phase is withdrawn through line 162 to a vessel 164. Liquid separated from the solids in vessel 164 is returned to the reactor through line 166 employing eductor 167. The spent solids are removed from the tank 164 through line 168 for regeneration, recycle or discharge to refuse.

In prior art processes such as hydrotreating where the liquid phase and the gas phase flow concurrently, the residence time of each phase in the catalyst bed is the same except for a slight difference resulting from slippage between the phases, However, in the present process where the liquid and gaseous phases flow countercurrently to one another, the residence time of each in the catalytic zone is independent and is determined by the flow rate of each phase and the physical dimensions of the reactor. Thus, the contact times of the liquid phase and the gaseous phase may be independently varied. By way of example, in hydrotreating reactor the residence time of the hydrocarbon liquid phase and the residence time of the hydrogen rich gas phase may be independently variable by suitable control over the entering flow rates of each stream. The partial pressure of the hydrogen in the reaction zone may be independent of the ratio between the flow rates of the hydrogen phase and the gas phase.

While preferred embodiments of the invention have been shown and described, it will be appreciated that the invention has many applications. It is intended to encompass all changes and modifications as fall within the scope and spirit of the appended claims.

I claim:

1. A hydrocarbon conversion process for removing sulfur and nitrogen from hydrocarbon oil; comprising introducing into a mulit-stage reactor a liquid hydrocarbon oil adjacent the top of said reactor and withdrawing liquid product from the bottom of said reactor, introducing a hydrogen-rich gas adjacent to the bottom of said reactor and withdrawing gaseous reaction and unreacted hydrogen from the top of said reactor, maintaining a series of spaced beds of suspended catalyst particles within said reactor, maintaining desired liquid levels of oil within each of said beds to provide suspension of catalyst particles in said oil, passing said liquid oil from one bed to the next lower bed, and separately passing said catalyst particles from one bed to the next adjaent bed.

2. A process according to claim 1 further comprising passing catalyst particles upwardly from one bed to the next adjacent bed in said series.

3. A process according to claim 1, further comprising educting said catalyst particles upwardly from one bed to the next adjacent bed throughout said series in said reactor.

4. A process according to claim 1, further comprising passing said catalyst particles downwardly from one bed to the next adjacent bed throughout said series in said reactor.

5. A process according to claim 1, further comprising independently regulating the residence time of said hydrocarbon oil and of said hydrogen-rich gas in said reactor.

6. A process according to claim 1, further comprising regulating the partial pressure of the hydrogen in the reactor independently of the ratio between the flow rates of said hydrocarbon oil and said hydrogen-rich gas.

7. A process according to claim 1, further comprising regulating the contact time of said liquid hydrocarbon oil with said catalyst particles independently of the contact time of said hydrogen-rich gas with said catalyst particles.

* * * * *